United States Patent [19]

Havas et al.

[11] 4,280,038
[45] Jul. 21, 1981

[54] METHOD AND APPARATUS FOR INDUCTING HEATING AND MELTING FURNACES TO OBTAIN CONSTANT POWER

[75] Inventors: George Havas, Youngstown; Fred D. Esenwein, Columbiana, both of Ohio

[73] Assignee: Ajax Magnethermic Corporation, Warren, Ohio

[21] Appl. No.: 954,312

[22] Filed: Oct. 24, 1978

[51] Int. Cl.³ .................. H05B 6/06; H02M 5/45
[52] U.S. Cl. .................. 219/10.77; 219/10.41; 363/37; 363/97; 13/26
[58] Field of Search ............... 219/10.77, 10.75, 10.41, 219/10.43, 482, 490, 497, 501; 323/102, 101, 20, 119; 363/75, 79, 96, 135, 97, 37, 35; 13/26

[56] References Cited
U.S. PATENT DOCUMENTS

| 2,604,575 | 7/1952 | Williamson | 219/10.77 |
| 2,945,112 | 7/1960 | Scott | 219/10.77 |
| 3,419,785 | 12/1968 | Lafuze | 363/79 X |
| 3,487,291 | 12/1969 | Dowgiallo, Jr. | 323/20 |
| 3,541,423 | 11/1970 | Kelly Jr. et al. | 363/96 X |
| 3,551,632 | 12/1970 | Geisel | 219/10.43 |
| 3,566,243 | 2/1971 | Landis | 363/37 |
| 3,718,852 | 2/1973 | Bailey | 323/102 X |
| 3,821,456 | 6/1974 | Havas | 219/10.77 |
| 3,846,694 | 11/1974 | Archer | 363/96 |
| 3,882,370 | 5/1975 | McMurray | 363/135 |
| 3,942,090 | 3/1976 | Matthes et al. | 363/37 |
| 4,009,433 | 2/1977 | Möltgen | 323/102 |
| 4,055,795 | 10/1977 | Mathieu | 323/102 |
| 4,121,150 | 10/1978 | Kelly Jr. | 323/102 |

Primary Examiner—B. A. Reynolds
Assistant Examiner—Philip H. Leung

[57] ABSTRACT

A method and apparatus for induction heating or melting furnaces of varying conductance, comprising controlled adjustment of the power factor angle in response to variations in load conductance to maintain constant power.

8 Claims, 7 Drawing Figures

METHOD AND APPARATUS FOR INDUCTING HEATING AND MELTING FURNACES TO OBTAIN CONSTANT POWER

The present invention relates, generally, to methods and apparatus for operating a constant current parallel resonant circuit inverter having loads of varying conductance. More specifically, the present invention relates to methods and apparatus for maintaining constant power to an induction heating or melting furnace wherein load conductances vary, by appropriate adjustment of the power factor angle in response to changes in load conductance.

Electrical apparatus for supplying an appropriate current to a tank circuit are well known. Conventionally, three phase line power at mains frequency is rectified to yield a dc current. Harmonic ripple is removed by the action of a smoothing choke, and the dc current is applied to a solid state inverter comprised of a full bridge of thyristors. The power inverter converts the dc current into a single phase alternating current of controllable frequency. The output, a substantially square wave of current, is applied to the parallel resonant tank load circuit, resulting in the development of a sinusodial voltage waveform therein.

Both the inductance and the resistance of loads in induction heating or melting furnaces varies widely. Controls in the past for such loads have been proposed for controlling the dc voltage. An example of the type of control is found in U.S. Pat. Nos. 3,551,632 and 3,942,090.

It has also been proposed to control the inverter by providing a constant turn-off time for the SCRs or thyristors comprising the bridge circuit. U.S. Pat No. 3,882,370 is representative of this type of control.

These approaches result in poor power factor in the supply line and consequently a large line KVA for a given power where variable loads are present.

Control of the inverter by maintaining constant voltage or constant turn-off time as stated above is suitable for loads whose conductance is substantially constant throughout the average work cycle; however, for inductive loads whose conductance varies widely, such controls result, as stated, in excessive line KVA requirements, and excessively lagging line power factor when it is desired to hold the power constant.

The present invention provides an efficient control for an inverter circuit and is particularly adapted to circuits supplying power to loads of widely varying conductance, and wherein the power supplied to the load is maintained essentially constant regardless of conductance variations. Also, an improved control is provided whereby the controlled bridge network for rectification of the source of the three phase line voltage is effectively isolated from the effects of any conductance variation in the load.

It is a primary object of the present invention to provide an improved method of operating a constant current parallel resonant circuit to deliver constant power to said circuit regardless of conductance variations therein.

It is also an object of the present invention to deliver constant power to an induction heating furnace whereby the power level is unaffected during operation of melting or heating cycle.

It is a further object of the present invention to provide a constant current parallel resonant circuit for induction heating and/or melting furnaces whereby variations in load conductance is effectively isolated from the input source.

Yet another object of the present invention is to provide apparatus for implementation of the aforesaid.

In accordance with the present invention, the foregoing and other objects and advantages are achieved by suitably adjusting the power factor angle in a parallel resonant circuit inverter in response to variations in load conductance, whereby power delivered to the load is maintained essentially constant.

Adjustment of the power factor angle is achieved by controlling the initiation of triggering time of the inverter bridge thyristors. The sequence cycle is determined by monitoring the power supplied to the load at all times, comparing the same to a pre-established reference for maximum power efficiency, generating a signal as to any variations in said power, and adjusting the timing of the switching means such as thyristors, SCRs, transistors, etc.

Other objects and advantages of the present invention will become apparent to the skilled artisan upon examination of the detailed description of preferred embodiments, taken in conjunction with the figures of drawings, wherein:

Figure 1:
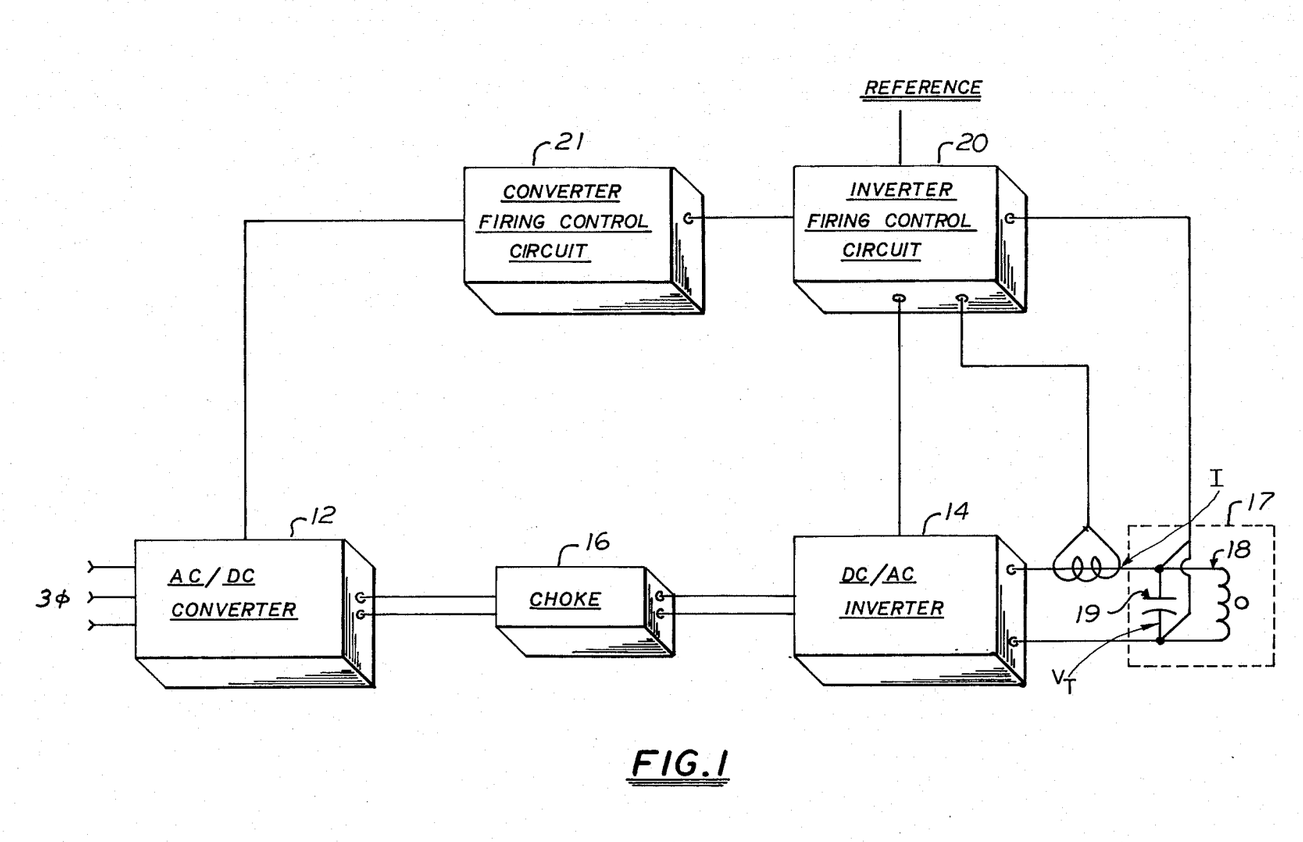
FIG. 1 is a functional block diagram of the control circuit of our invention.

Referring to the figures of drawing, in all of which like parts are identified with like numerals, FIG. 1 shows an AC/DC converter or rectifier 12 which supplies dc current to a DC/AC inverter 14 through a choke or reactor 16. The inverter 14 provides power to a parallel resonant load circuit 17 comprising an induction heating and/or melting furnace 18 and tuning capacitance 19. An inverter firing control circuit 20 provides the firing sequence of the inverter switching means which may be thyristors (e.g., SCRs), transistors, or functionally equivalent devices known in the art. A converter firing control circuit 21 provides control of the bridge rectifiers of the converter 12, whereby the dc output is controlled.

Figure 2:
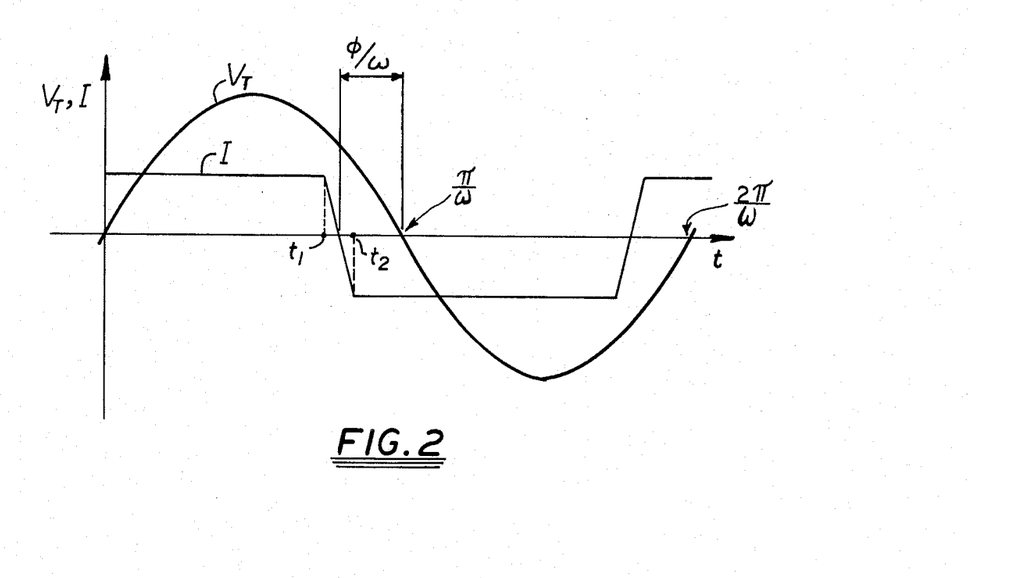
FIG. 2 is a graphic representation of the load current and the voltage waveform across the tank circuit.

The inverter 14 supplies a substantially square wave of current I to the parallel resonant load which results in the development of a generally sinusodial wave form of voltage $V_T$ therein. FIG. 2 illustrates the relationship between voltage and current wave forms which, as shown, are displaced by an electrical angle $\phi$ such that the current leads the voltage.

Since the inverter current, I, is continuous and symmetrical the fundamental component of the inverter current, $I_F$, is displaced by the same electrical angle $\phi$ with respect to the voltage, $V_T$, the cosine function of this electrical angle $\phi$ being defined as the fundamental operating power factor, or simply the power factor of the load circuit.

With reference to FIG. 2, $t_1$ represents the time at which the current wave form begins to switch from full conduction through one path toward full conduction through the alternate path, this latter time represented as $t_2$. The difference between these two times represents the commutation time of the inverter circuitry. The commutation from positive to negative must be complete prior to the cross over of the voltage wave form.

Figure 3:
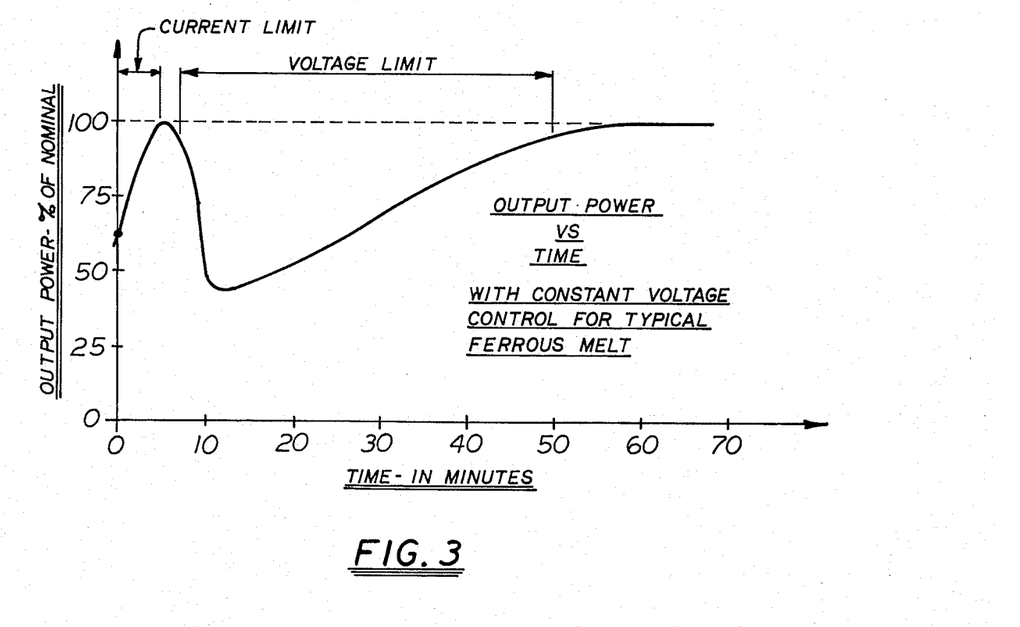
FIG. 3 is a graphic representation of power variations typically experienced in an induction melting or heating furnace.

FIG. 3 illustrates a typical power cycle observed during the induction melting of a ferromagnetic metal utilizing the well-known constant voltage method of control. From an initial power level at the time of charging the furnace, after a brief increase, the output power decreases due to the radical decrease in load conductance as the charge heats through the Curie transition, leveling off at an intermediate value until melting initiates. As the charge melts, the load conductance, increases, resulting in a gradual increase in power. The variations in power are directly attributable to variations in the conductance of the charge.

Prior art devices which provide either constant voltage control or constant turn off time control cannot adequately account for these variations in conductance which are observed during actual heating or melting. These control methods are suitable for loads which do not exhibit variations in conductance throughout a work cycle; however, for loads where conductance varies widely, these approaches for controlling the inverter result in excessive line KVA requirements and excessively lagging line power factor when it is desired to hold the power constant. The control circuit of the present invention, which alters the phase angle relationship between voltage and current, overcomes the drawbacks of the prior art.

More specifically, the control circuit of the present invention senses the voltage $V_T$ across, and current I through, the tank load and generates a signal proportional thereto which is compared against a predetermined reference signal. The reference signal is chosen to establish the desired, predetermined power level in the load. Appropriate comparison between the sensed power level and desired power level yields a correction signal indicating the degree of variation from the determined reference and to provide a match for the reference by suitably adjusting the firing time of the inverter switching means. This, in turn, will cause a change in the power factor angle sufficient to offset the deviation from optimum power conditions occasioned by variation in conductance of the load. The relationship between the current, voltage, and phase angle are best explained with reference to FIG. 4.

Figure 4:
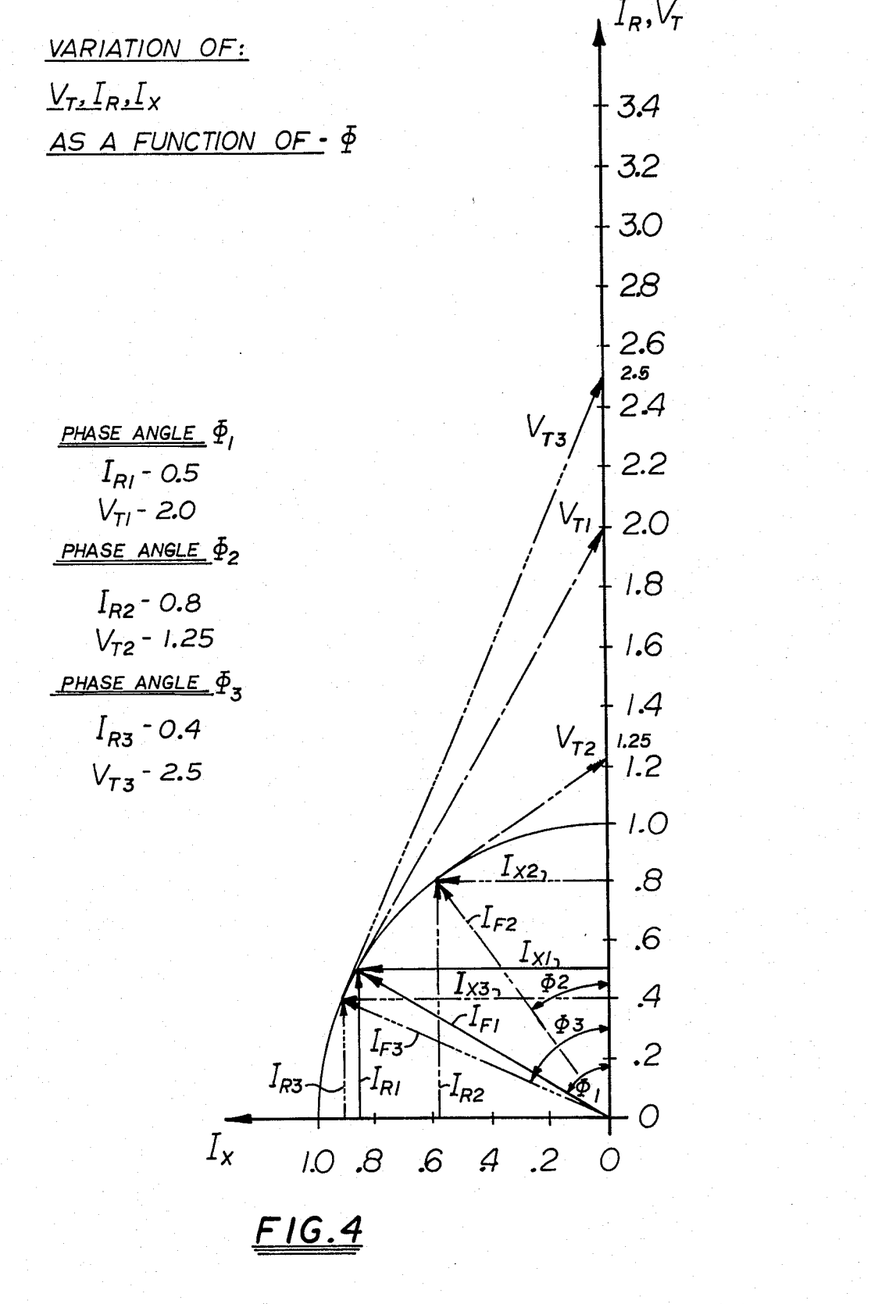
FIG. 4 is a graph showing the relationships of the tank circuit voltage, in-phase and reactive components of the load current as functions of the phase angle.

FIG. 4 graphically represents the variations in tank voltage $V_T$ and the in-phase component of the load current as a function of the phase angle $\phi$ between them. The vector $I_F$ represents the fundamental component of the load current, which is constant in magnitude. Accordingly, the locus of the vector throughout the range of phase angles from 0° to 90° circumscribes a quadrant of a circle. The current vector $I_F$ is comprised of two components; an in-phase or real component $I_R$, and a reactive component $I_X$. The relative magnitudes of $I_R$ and $I_X$ are determined by the phase angle $\phi$ throughout the range of FIG. 4. The voltage $V_T$ is determined by the intersection of a tangent from the arc of the vector $I_F$ with the ordinate of the graph of FIG. 4. Accordingly, power in the tank circuit may be easily determined as the product of $V_T$ times $I_R$. Operating under the principles of the present invention, this product (i.e., the power) remains constant regardless of the phase angle.

For example, for a phase angle $\phi_1$, the in-phase current is 0.5 whereas the tank voltage is 2.0 on the scale of FIG. 4. As the phase angle changes to $\phi_2$, the in-phase current is now 0.8 while the tank voltage is 1.25. The third example given in FIG. 4 for $\phi_3$ represents an in-phase current of 0.4 and a tank voltage of 2.5. Consequently, in each case, the power remains constant at a value of 1.0 on the scale of FIG. 4.

The phase angle $\phi$ may be directly related to the conductance of the load G insofar as the power factor ($\cos \phi$) is a function of the conductance according to the relationship $$\cos \phi = K(G^{\frac{1}{2}}),$$

where K is constant. Alternately stated, $$\phi = \cos^{-1} [K(G^{\frac{1}{2}})]$$

Accordingly, the phase angle $\phi$ may be utilized as a controllable variable to offset the effects of variations in the uncontrollable variable, conductance in order to ensure that constant power to the load is maintained during the work cycle.

Figure 5:
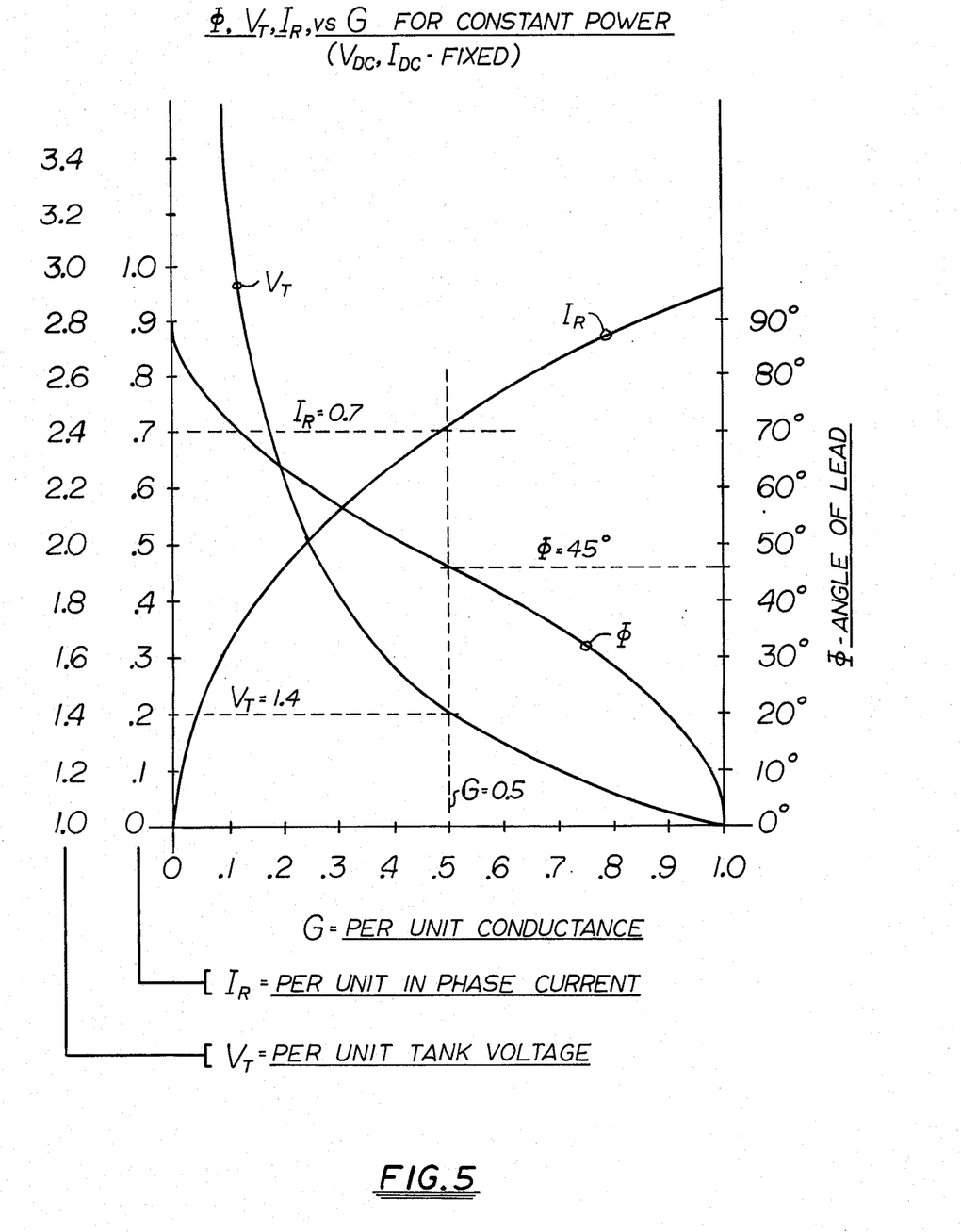
FIG. 5 is a graph showing the relationships between phase angle, tank voltage, in-phase current at varying conductance, the dc current and voltage being fixed.

The relationship between the phase angle, tank voltage, and in-phase current versus the conductance of the load is shown in FIG. 5, for fixed dc voltage and dc current. Thus, from FIG. 5, the constant power parameters for a given conductance may be easily calculated. For example, for a conductance of 0.5, the phase angle $\phi$ to yield a constant power will be 45°, as determined by intersection of the curve labeled $\phi$ and a vertical extension through the abscissa axis at 0.5. Under these conditions, to maintain the constant power desired, the tank voltage will be 1.4 whereas the in-phase current will be 0.7. The product of current and voltage under these circumstances yields a power of one unit, consistent with the objectives of maintaining unity power. As conductance changes, the value of $\phi$ necessary to ensure constant power also changes, the absolute value being ascertainable from FIG. 5.

Figure 6:
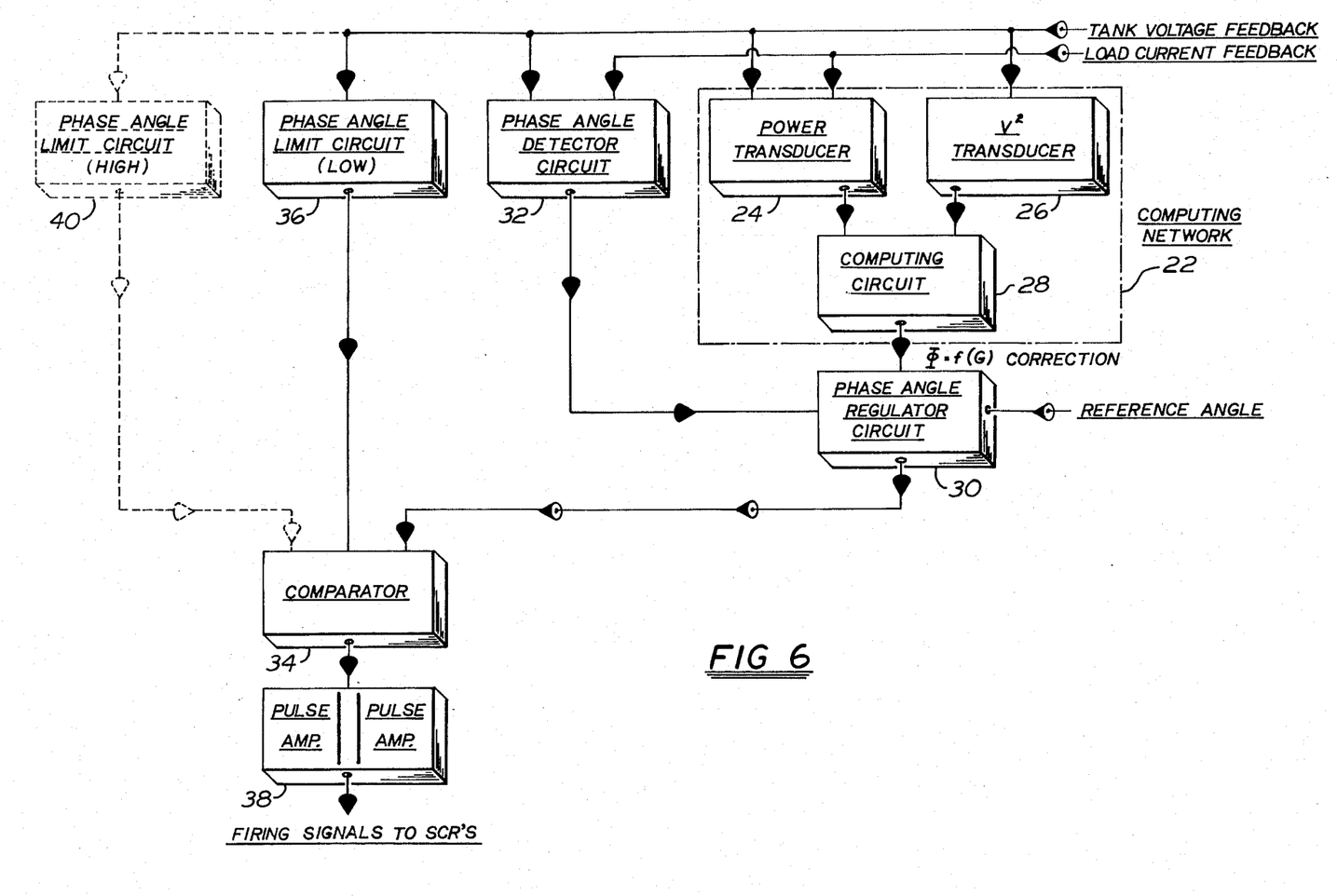
FIG. 6 is a functional block diagram of a firing circuit employed in the control circuit of the present invention, and in phantom a limit circuit which may be employed therewith; and, FIG. 7 is a functional block diagram of an alternate embodiment of firing circuit in accordance with the present invention, and in phantom a limit circuit which may be employed therewith.

FIG. 6 is a functional block diagram of the inverter firing control circuit 20 which implements the aforementioned method of the present invention, whereby the phase angle between voltage and current is altered in response to variations in cnductance of the load in order to ensure that constant power is delivered thereto. Feedback signals representing tank voltage and load current are applied to a computing network designated generally as 22. This computing network is comprised of a power transducer 24 and a voltage squared transducer 26 which receive these feedback signals and generate output signals proportional thereto. The power transducer receives inputs of both voltage and current to produce a signal proportional to power while the voltage squared transducer receives only a voltage input. The outputs from the transducers are applied to a computing circuit 28 which generates an error signal representative of the phase angle as a function of the conductance of the load. This error signal is applied as a first input to a phase angle regulator circuit 30. The feedback signals from the load are also applied to the input of a phase angle detector 32 which provides an input to the regulator 30 representative of the phase angle in the load current/voltage relationship. A reference angle input signal, selected to establish the proper power level in the load, is applied as a third input to the regulator circuit 30. The error signal from the computing network 22 is additive or subtractive with respect to the reference angle input, the sum of these two inputs being compared with the detected phase angle in the load circuit. A correction output from the phase angle regulator is fed to a comparator circuit 34, the correction output being a direct indication of any error in the phase angle from the appropriate angle necessary to ensure the desired power level. That is, as conductance of the load changes, it is necessary to alter the phase angle to offset the variation. The computing network generates the appropriate correction factor which is first summed with the constant reference angle input and then compared with the actual phase angle between current and voltage in the load. This yields the correction output to the comparator circuit.

For example, assume a phase angle $\phi$ of 30° is necessary to establish the proper power level to be supplied to the load as determined from the relationship of $I_R$ and $V_T$ as functions of G in FIG. 5. A voltage corresponding to 30° will be applied as the reference angle input to the phase angle regulator 30. The phase angle detector 32 will sense this angle of 30° between voltage and current which is established in the load, while the computing network 22 will generate a correction factor which will be zero provided the conductance remains unchanged. Thus, no correction signal will be generated. Should the conductance of the load decrease, a larger phase angle will be necessary to provide the established or required power to the load. The increase in $\phi$ as a function of the new G will be computed by the network 22 and a signal representative thereof fed to regulator 30. The detector 32 will continue to detect 30°. Thus, when the signal from network 22 is summed with the reference 30° and compared with the detected 30°, a correction signal representing the error will be applied to the input of comparator 34, for altering the initiation of the firing time of the inverter thyristors. The change in the timing of thyristor firing will cause a greater displacement between the cross over of inverter current and tank voltage shown in FIG. 2, increasing the phase angle $\phi$. Once the phase angle is adjusted to the larger value necessary due to the decrease in conductance, the sum of the correction signal from network 22 and the reference angle input will again be in balance with that from the detector 32, until another variation in conductance is observed.

A phase angle limit circuit 36 establishes a minimum phase angle which is acceptable to accomodate the minimum turn off time of the inverter thyristors by prohibiting the computing circuit from firing the bridge thyristors at too low an angle $\phi$. The phase angle limit circuit receives an input from the tank voltage feedback and provides an output to the comparator which is a constant, predetermined value representing the minimum phase angle which is to be accepted. Provided that the output from the phase angle regulator circuit is higher than that of the limiting circuit, the former will cause the comparator to issue a pulse for adjusting of the initiation of the firing time of the thyristors. Should the minimum tolerable level be exceeded, the phase angle limit circuit will override the command from the regulator circuit and the comparator will issue the pulse representative of the minimum turn off time. The pulses from the comparator are amplified in pulse amplifiers 38 which deliver suitable firing signals to the gate electrodes of the thyristors.

An optional phase angle limit circuit 40, to establish a maximum phase angle value may also be provided, and is shown in phantom lines in FIG. 6. If, for example, the phase angle increases to a value whereby the maximum voltage rating on circuit components is exceeded, the maximum phase angle limit circuit will provide an override signal to the comparator. Consequently, the phase angle may be varied within predetermined minimum and maximum values chosen to ensure sufficient turn off time for the inverter components while precluding excessive voltage from being developed thereacross.

In operation, the embodiment shown in FIG. 6 provides a simplified, yet highly efficient, method for ensuring constant power is delivered to the load circuit. For a given mode of operation the power required may be easily determined. Thus, the appropriate value of $I_R$ and $V_T$ can be ascertained for a given load conductance from the graph of FIG. 5. This will establish the proper phase angle $\phi$ corresponding to this power; and a signal proportional to the angle is provided for a reference angle input to the phase angle regulator circuit. During the work cycle, the phase angle detector circuit monitors the actual phase angle between load voltage and current while the computing network computes $\phi$ as a function of the conductance. Should the conductance change, the phase angle will no longer be at a value proper to deliver the established required power to the load and an error signal will be computed. The error signal generated is summed with the reference angle and compared with the detected value to generate an output signal to the comparator circuit. This signal then adjusts the initiation of the firing time of the bridge thyristors to change the phase angle relationship within the predetermined minimum and maximum values permitted by the phase angle limiting circuits.

Figure 7:
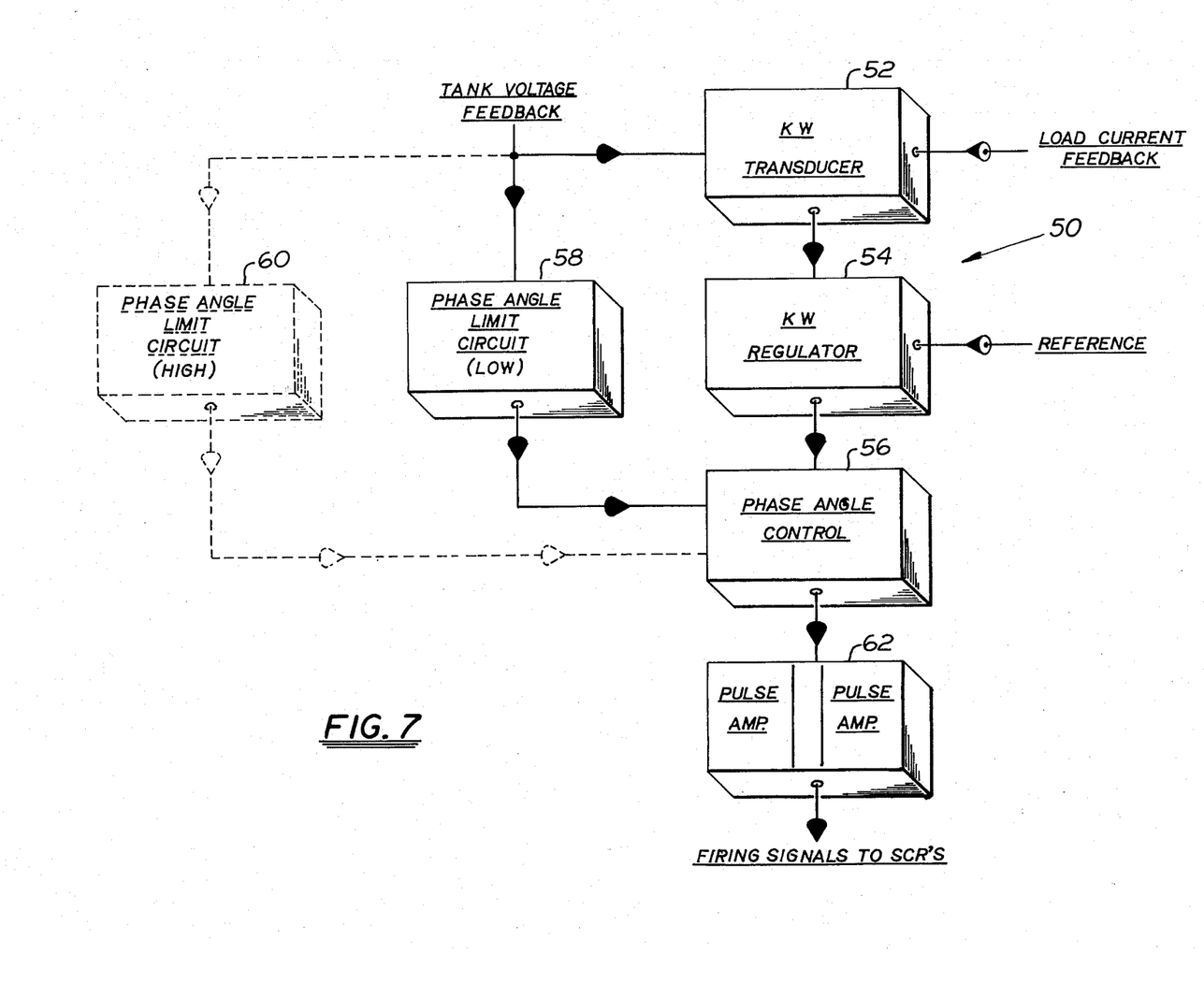

FIG. 7 is a functional block diagram of an alternate embodiment of a firing control circuit for implementation of the method of the present invention. The circuitry of FIG. 7 is a closed loop regulator, designated generally as 50, which ensures constant power is delivered to the load circuit 17. The closed loop regulator is comprised of a power transducer 52 which receives load current feedback signals and tank voltage feedback signals in order to determine the power of the load and generate an output signal proportional thereto. This power signal is delivered as an input to a power regulator 54 which also receives, as an input, a reference signal proportional to the desired, predetermined power to be delivered to the load. The regulator compares the sensed power signal from the transducer with the reference signal and provides an output error signal which is applied as an input to a phase angle control circuit 56. Minimim and maximum phase angle limit circuitry, 58 and 60, respectively, are provided as in the embodiment of FIG. 6 to override the error signal delivered to the phase angle control in the event the limits of the predetermined phase angle range are exceeded. Provided the error signal is within the acceptable range, an output pulse is generated by the phase angle control circuitry and is amplified by pulse amplifier 62 prior to being applied to the gate electrodes of the bridge thyristors.

The closed loop regulator of FIG. 7 differs in operation from that device of FIG. 6 insofar as the phase angle between voltage across, and current to, the tank circuit is not computed and then compared with a pre-established reference. Rather, the phase angle is altered, either higher or lower, in order to satisfy the demands imposed upon the firing control circuits by the reference power input to the regulator 54. The net effect, however, is identical in that constant power at constant current (I) is delivered to the load as conductance thereof varies, by altering the time of firing the bridge thyristors and, hence, the phase angle relationship between voltage and current.

While the invention has now been described with reference to certain preferred embodiments, the skilled artisan will recognize that various substitutions, modifications, changes, and omissions may be made without departing from the spirt thereof. Accordingly, it is intended that the scope of the present invention be limited solely by that of the following claims.

What we claim is:

1. Power control means for induction heating or melting furnace of varying load conductance, a parallel resonant circuit DC/AC inverter supplying AC power to said furnace, means for holding the said AC power constant by adjustment of the power factor angle to the parallel resonant circuit load as a function of the varying load conductance of the said load while maintaining the direct current to the inverter constant, and limit means to restrict the power factor angle to a predetermined minimum value.

2. Power control means as claimed in claim 1, wherein a closed loop power regulator is provided to maintain the power automatically to a preset value.

3. Power control means as claimed in claim 1, wherein the power factor angle is restricted to a predetermined maximum value.

4. Power control means as claimed in claim 2, wherein the power factor angle is restricted to a predetermined maximum value.

5. A method of maintaining constant AC power supplied by a parallel resonant circuit inverter to an induction heating or melting furnace of varying load conductance, by adjusting the power factor angle to the parallel resonant circuit load as a function of the varying load conductance while maintaining a constant direct current to the inverter and limiting the minimum value of the power factor angle.

6. A method as claimed in claim 5, wherein the power is maintained automatically at a preset value.

7. A method as claimed in claim 5, wherein the power factor angle is restricted to a predetermined maximum value.

8. A method as claimed in claim 6, wherein the power factor angle is restricted to a predetermined maximum value.

* * * * *

UNITED STATES PATENT AND TRADEMARK OFFICE
CERTIFICATE OF CORRECTION

PATENT NO. : 4,280,038

DATED : July 21, 1981

INVENTOR(S) : George Havas and Fred D. Esenwein

It is certified that error appears in the above—identified patent and that said Letters Patent is hereby corrected as shown below:

Title Page numbered section [54] line 2, "Inducting" should read ---Induction---;

Column 1, line 1 of the title, "Inducting" should read ---Induction---;

Column 4, line 55, "cnductance" should read ---conductance---

Signed and Sealed this

Thirteenth Day of October 1981

[SEAL]

Attest:

GERALD J. MOSSINGHOFF

Attesting Officer

Commissioner of Patents and Trademarks